(12) United States Patent
Daley et al.

(10) Patent No.: US 7,635,090 B1
(45) Date of Patent: Dec. 22, 2009

(54) PATTERN GENERATING FONTS AND SHEETS OF WRITING MATERIAL BEARING SUCH FONTS

(75) Inventors: Kevin Daley, Coventry, CT (US); Andrew Voss, Ellington, CT (US)

(73) Assignee: Expedata, LLC, Dayton, OH (US)

( * ) Notice: Subject to any disclaimer, the term of this patent is extended or adjusted under 35 U.S.C. 154(b) by 829 days.

(21) Appl. No.: 10/935,603

(22) Filed: Sep. 7, 2004

(51) Int. Cl.
*G06K 19/06* (2006.01)

(52) U.S. Cl. ............................ 235/494; 235/487

(58) Field of Classification Search ............... 235/494, 235/454, 462.08, 462.2, 487
See application file for complete search history.

(56) References Cited

U.S. PATENT DOCUMENTS

| | | | |
|---|---|---|---|
| 5,661,506 A * | 8/1997 | Lazzouni et al. | 345/179 |
| 5,852,434 A | 12/1998 | Sekendur | |
| 6,141,441 A * | 10/2000 | Cass et al. | 382/166 |
| 6,502,756 B1 * | 1/2003 | Fåhraeus | 235/494 |
| 6,548,768 B1 * | 4/2003 | Pettersson et al. | 178/18.01 |
| 6,570,104 B1 | 5/2003 | Ericson et al. | |
| 6,586,688 B2 * | 7/2003 | Wiebe | 178/18.09 |
| 6,864,880 B2 * | 3/2005 | Hugosson et al. | 345/162 |
| 2001/0055410 A1 * | 12/2001 | Matsueda et al. | 382/104 |
| 2002/0027165 A1 * | 3/2002 | Iwai et al. | 235/494 |
| 2002/0048404 A1 * | 4/2002 | Fahraeus et al. | 382/188 |
| 2002/0080396 A1 * | 6/2002 | Silverbrook et al. | 358/1.15 |
| 2002/0195501 A1 * | 12/2002 | Mazaika | 235/494 |
| 2003/0012455 A1 * | 1/2003 | Olsson et al. | 382/286 |
| 2003/0053699 A1 * | 3/2003 | Olsson | 382/228 |
| 2003/0055986 A1 * | 3/2003 | Lynggaard | 709/227 |
| 2003/0061188 A1 * | 3/2003 | Wiebe et al. | 707/1 |
| 2003/0122855 A1 * | 7/2003 | Pattersson | 345/690 |
| 2004/0035935 A1 * | 2/2004 | Takahashi et al. | 235/462.09 |
| 2005/0041264 A1 * | 2/2005 | Jacobsen | 358/1.15 |

* cited by examiner

*Primary Examiner*—Daniel A Hess
*Assistant Examiner*—Paultep Savusdiphol
(74) *Attorney, Agent, or Firm*—Dinsmore & Shohl LLP

(57) ABSTRACT

A sheet of writing material bears a plurality of position indicating markings. The markings on the sheet constitute parts of a plurality of characters which are printed on the sheet, directly abutting each other. The characters make up a font in which each character is defined within a substantially rectangular area having a predetermined width and height. The predetermined area is divided into four virtual grids with each grid containing a marking, and each marking being located in one of four positions within its associated virtual grid. The four positions are displaced from the center of the virtual grid in four directions.

6 Claims, 3 Drawing Sheets

0x00 - 0x0F
0x10 - 0x1F
0x20 - 0x2F
0x30 - 0x3F
0x40 - 0x4F
0x50 - 0x5F
0x60 - 0x6F
0x70 - 0x7F
0x80 - 0x8F
0x90 - 0x9F
0xA0 - 0xAF
0xB0 - 0xBF
0xC0 - 0xCF
0xD0 - 0xDF
0xE0 - 0xEF
0xF0 - 0xFF

FIG-1

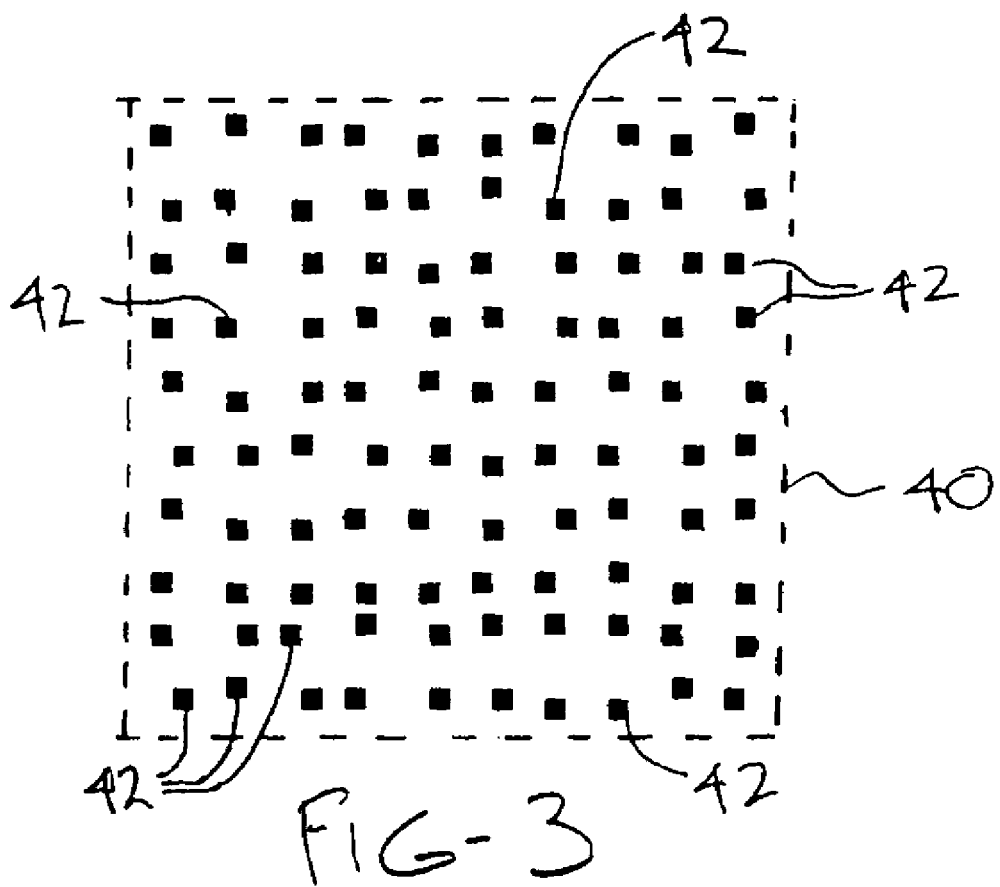

PATTERN GENERATING FONTS AND SHEETS OF WRITING MATERIAL BEARING SUCH FONTS

CROSS-REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

In many situations it is desirable to be able to determine a position on a surface. For example, it may be desirable to determine the position on the surface of a sheet of writing material of a pen point when the pen is used to write on the sheet, thereby facilitating recording and digitizing the document. It may also be desirable to determine a position of a surface when creating an electronic version of handwritten information.

U.S. Pat. No. 5,852,434 describes a device for determining the position of a pen with respect to a sheet of paper when the pen is used to mark or write on the sheet. The system relies on a writing surface bearing a position-coding pattern for determining X-Y coordinates. A detector on the pen detects the position-coding pattern and determines the position on the sheet of the point of the pen. A processor determines this position in relation to the writing surface based on the detected position-coding pattern. The device allows a user to input handwritten or hand-drawn information to a computer at the same time the information is written or drawn on the writing surface.

The difficulties associated with generating a positional pattern of thousands of dots are significant. The dot pattern must be generated and then printing instructions must be generated to control the printer in printing a large number of circles which are filled in as the dots. Drawing circles is process intensive and very time consuming. While such time consuming pre-printing operations may be acceptable when only a few sheets of writing material are to be printed by means of high speed presses, when the dot patterns are determined to vary from sheet to sheet and when the sheets are to be printed on laser printers of the type utilized in a business office or a home office, then the times associated with generating these patterns may become undesirably long. It is seen, therefore, that a need exists for a sheet of writing material that can be printed rapidly.

SUMMARY OF THE INVENTION

This need is met by a sheet of writing material bearing a plurality of position indicating markings according to the present invention. The markings on the sheet constitute parts of a plurality of characters from a character font that is printed on the sheet. The characters directly abut each other. Each character is defined within a substantially rectangular area having a predetermined width and height. The predetermined area is divided into four virtual grids, with each grid containing a marking. Each marking is located in one of four positions within its associated virtual grid. The four positions are displaced from the center of the virtual grid in four directions.

The font may comprise 256 characters of unique dot patterns. The virtual grids may be positioned in upper left, upper right, lower left, and lower right portions of the substantially rectangular area. Each marking in the character font may preferably be substantially round.

The width and height of the substantially rectangular area may be substantially equal, whereby the substantially rectangular area is substantially square. The virtual grids may each be one fourth of the size of the substantially rectangular area, whereby the virtual grids are each substantially square. Each of the markings is preferably a substantially round marking and the diameter of each marking is preferably substantially one-third the size of the height and width of the virtual grid in which it is contained. The center of a round marking is displaced from the center of the virtual grid by one half of the diameter of the round marking when the marking is in any one of the four positions within the associated virtual grid.

The four positions may be equally spaced around the center of the virtual grid. The four positions are preferably above, below, to the left and to the right of the center of the virtual grid. The characters may be stored as a part of an external glyph based font, or the characters may be stored as part of a PostScript based font.

The characters may be printed side-by-side and stacked in respective rows and columns on the sheet of writing material, with the characters directly abutting.

It is an object of the present invention to provide a sheet of writing material bearing a plurality of position indicating markings, in which the markings on the sheet constitute parts of a plurality of characters from a character font. Other objects and advantages of the invention will be apparent from the following description, the accompanying drawings and the appended claims.

BRIEF DESCRIPTION OF THE DRAWINGS

FIG. 1 illustrates a font of characters according to the present invention;

FIG. 3 illustrates characters of the font printed side-by-side and stacked in respective rows and columns on a portion of a sheet of writing material.

DETAILED DESCRIPTION OF THE PREFERRED EMBODIMENT

Figure 2:
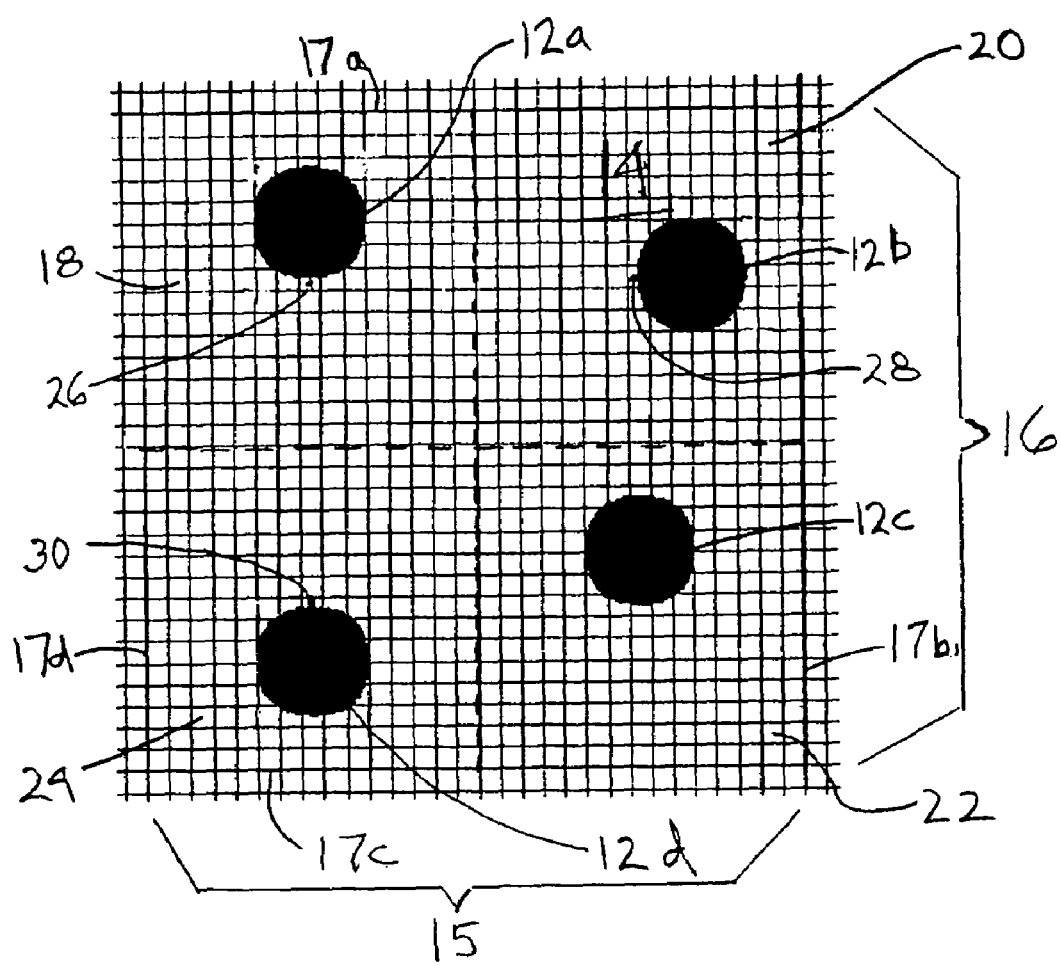
FIG. 2 shows the arrangement of the markings making up a character of the font.

Reference is made to FIG. 1, which illustrates a font of characters, configured according to the present invention. As will be described more completely below, this is a character font of glyphs that are used to create a dot matrix that may be printed over a sheet of writing material, or over only a selected portion or portions of such a sheet. The font contains 256 characters of unique dot patterns, such as for example the character 0x00 designated by the dashed lines 10 surrounding the markings 12. Each character in the font consists of four markings 12, positioned slightly differently in a cluster.

Reference is now made to FIG. 2 which shows one of the characters of the font of FIG. 1. The character consists only of the four markings 12a, 12b, 12c, and 12d. The balance of the lines in FIG. 2 are shown only for purposes of illustration and do not constitute part of the character per se.

The character of FIG. 2, like all of the characters in the font of FIG. 1, is defined within a substantially rectangular area 14 having a predetermined width 15 and height 16. Area 14 is bounded by four lines 17a, 17b, 17c, and 17d. The predetermined area 14 is divided into four virtual grids 18, 20, 22 and 24. The width 15 and height 16 of the substantially rectangular area 14 are substantially equal, making the substantially rectangular area 14 substantially square. The virtual grids 18, 20, 22, and 24 are positioned in upper left, upper right, lower left, and lower right portions of the substantially rectangular area 14. The virtual grids 18, 20, 22 and 24 are each one-fourth of the size of the substantially rectangular area 14, making the virtual grids also each substantially square in shape.

Each grid contains one of the markings 12a-12d, and each of the markings 12(a)-(d) is substantially round in shape. Each marking is located in one of four positions within its associated virtual grid. As will be apparent from closer inspection of FIG. 2, these positions are displaced from the center of the virtual grid in one of four directions. For example, the marking 12a is above the center 26 of its associated virtual grid 18, as is the marking 12c. Marking 12b is to the right of the center 28 of the virtual grid 20, and marking 12d is below the center 30 of virtual grid 24. Finally, although not shown in FIG. 2, a fourth possible position for a marking is to the left of the center of its virtual grid.

Each of the markings is shown as a substantially round marking. This is not essential, however, and markings of other shapes may be used in the characters making up the font. As shown in FIG. 2, the diameter of each marking 12 is substantially one-third the size of the height and width of the virtual grid 18-24 in which it is contained. It will be further noted that the center of a round marking 12 is displaced from the center of its associated virtual grid by one half of the diameter of the round marking 12 when the marking is in any one of the four positions. Thus, the center of the grid is located at the periphery of the marking 12 contained within the grid. The four positions for the markings 12 are equally spaced around the center of the virtual grids, and the positions are above, below, to the left and to the right of the center of the virtual grid.

As may be appreciated, the characters may be stored as a part of an external glyph based font. Alternatively, the characters may be stored as part of a PostScript based font. When utilizing this font to create large arrays of a unique dot pattern for output, the processing time is greatly reduced. A double-byte character array might be used instead of the standard 256 character ASCII set. The double-byte character, also known as Unicode, can support up to 65,536 different characters. Each character in the font set would have eight markings instead of four. The result would be a larger area of dots covered by a character resulting in a further reduction in processing time.

Returning to the font of FIGS. 1 and 2, the font characters may be specified in PostScript. PostScript is a programming language that describes the appearance of a printed material.

Each character is programmed to contain four circular marks or "dots." Each dot is created by PostScript commands that dictate where the dot is to be placed within the virtual grid. An example of the PostScript programming for a font character is as follows.

/dotquadrdru % Font # 100

{

200 450 moveto 200 450 32 0 360 arc 450 400 moveto 450 400 32 0 360 arc 200 150 moveto 200 150 32 0 360 arc 450 200 moveto 450 200 32 0 360 arc closepath fill } bind def When utilizing this font to create large arrays of unique dot patterns for output, the processing time is greatly reduced from that required where a special processing command is used to cause the printer to draw each marking as a separate circle.

Reference is now made to FIG. 3 which shows an example of several characters printed side-by-side and stacked in respective rows and columns so as to cover a specific area 40. It will be noted that the markings 42 are shown as square in shape. However, markings of any desired shape may be used.

The present invention contemplates a sheet of writing material bearing a plurality of position indicating markings 12, 42, or a portion of a sheet of writing material bearing such markings. The markings on the sheet constitute parts of a plurality of characters from the character font. The characters are printed on the sheet in directly abutting fashion, however, so that the result is a sheet that appears covered with markings, without the characters being readily distinguishable to the casual observer.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A sheet of writing material bearing a plurality of position indicating markings, said markings on said sheet constituting parts of a plurality of characters from a character font on said sheet, said characters directly abutting, each character defined within a substantially square area having a predetermined width and height, said square area being divided into four square virtual grids of substantially equal size with each grid containing a substantially round marking, each marking having a diameter that is substantially one-third the size of the height and width of the virtual grid in which it is contained and being located in one of four positions within its associated virtual grid, and said four positions being displaced from a center of said virtual grid in four directions, the center of a round marking being displaced from the center of the virtual grid by one half of the diameter of the round marking when the marking is in any one of the four positions within the associated virtual grid, said position indicating markings permitting an optical detector on a pen to determine the location on the sheet where the point of the pen makes a mark.

2. The sheet of writing material of claim 1, in which said font comprises 256 characters of unique dot patterns.

3. The sheet of writing material of claim 1, in which said virtual grids are positioned in upper left, upper right, lower left, and lower right portions of said substantially square area.

4. The sheet of writing material of claim 1, in which said four positions are equally spaced around said center of said virtual grid.

5. The sheet of writing material of claim 1, in which said four positions are above, below, to the left and to the right of said center of said virtual grid.

6. The sheet of writing material of claim 1 in which said characters are printed side-by-side and stacked in respective rows and columns.

* * * * *

UNITED STATES PATENT AND TRADEMARK OFFICE
CERTIFICATE OF CORRECTION

| | | |
|---|---|---|
| PATENT NO. | : 7,635,090 B1 | Page 1 of 1 |
| APPLICATION NO. | : 10/935603 | |
| DATED | : December 22, 2009 | |
| INVENTOR(S) | : Daley et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1132 days.

Signed and Sealed this

Ninth Day of November, 2010

David J. Kappos
*Director of the United States Patent and Trademark Office*